US012613807B2

(12) United States Patent
Grochowski et al.

(10) Patent No.: US 12,613,807 B2
(45) Date of Patent: Apr. 28, 2026

(54) METHOD, SYSTEM, AND APPARATUS FOR PAGE SIZING EXTENSION

(71) Applicant: UNM RAINFOREST INNOVATIONS, Albuguerque, NM (US)

(72) Inventors: Edward Grochowski, San Jose, CA (US); Julio Gago, Barcelona (ES); Roger Gramunt, Portland, OR (US); Roger Espasa, Barcelona (ES); Rolf Kassa, Braunschweig (DE)

(73) Assignee: UNM RAINFOREST INNOVATIONS, Albuquerque, NM (US)

( * ) Notice: Subject to any disclaimer, the term of this patent is extended or adjusted under 35 U.S.C. 154(b) by 0 days.

(21) Appl. No.: 17/404,770

(22) Filed: Aug. 17, 2021

(65) Prior Publication Data

US 2021/0374069 A1 Dec. 2, 2021

Related U.S. Application Data

(63) Continuation of application No. 16/560,213, filed on Sep. 4, 2019, now abandoned, which is a continuation (Continued)

(51) Int. Cl.
G06F 12/1009 (2016.01)
G06F 12/0864 (2016.01)

(Continued)

(52) U.S. Cl.
CPC ...... *G06F 12/1009* (2013.01); *G06F 12/0864* (2013.01); *G06F 12/1027* (2013.01);

(Continued)

(58) Field of Classification Search
CPC ............. G06F 12/1009; G06F 12/0864; G06F 12/1027; G06F 12/145; G06F 2212/152;

(Continued)

(56) References Cited

U.S. PATENT DOCUMENTS 5,524,212 A 6/1996 Somani et al.
5,630,087 A 5/1997 Talluri et al.

(Continued)

OTHER PUBLICATIONS

Sattler, A, Intel's IA-64 and 64-Bit Extensions Technology, 2004, In Contemporary Challenges in Information Technology-Results of the MSc-Seminars in SS2004 and WS 2004/05, 11pages (Year: 2004).*

(Continued)

*Primary Examiner* — Gary W. Cygiel
(74) *Attorney, Agent, or Firm* — MH2 Technology Law Group LLP

(57) ABSTRACT

A method, system, and apparatus may initialize a fixed plurality of page table entries for a fixed plurality of pages in memory, each page having a first size, wherein a linear address for each page table entry corresponds to a physical address and the fixed plurality of pages are aligned. A bit in each of the page table entries for the aligned pages may be set to indicate whether or not the fixed plurality of pages is to be treated as one combined page having a second page size larger than the first page size. Other embodiments are described and claimed.

20 Claims, 5 Drawing Sheets

Related U.S. Application Data of application No. 15/384,067, filed on Dec. 19, 2016, now Pat. No. 10,445,245, which is a continuation of application No. 13/722,485, filed on Dec. 20, 2012, now Pat. No. 9,934,155, which is a continuation of application No. 11/967,868, filed on Dec. 31, 2007, now Pat. No. 9,244,855.

(51) Int. Cl.
*G06F 12/1027* (2016.01)
*G06F 12/14* (2006.01)

(52) U.S. Cl.
CPC ...... *G06F 12/145* (2013.01); *G06F 2212/152* (2013.01); *G06F 2212/6032* (2013.04); *G06F 2212/652* (2013.01); *G06F 2212/657* (2013.01); *G06F 2212/68* (2013.01)

(58) Field of Classification Search
CPC ....... G06F 2212/6032; G06F 2212/652; G06F 2212/657; G06F 2212/68
See application file for complete search history.

(56) References Cited

U.S. PATENT DOCUMENTS

| | | | |
|---|---|---|---|
| 5,918,251 | A | 6/1999 | Yamada et al. |
| 6,012,132 | A | 1/2000 | Yamada et al. |
| 6,092,172 | A | 7/2000 | Nishimoto et al. |
| 6,112,285 | A | 8/2000 | Ganapathy et al. |
| 6,289,431 | B1 | 9/2001 | Bigbee et al. |
| 6,349,380 | B1 | 2/2002 | Shahidzadeh et al. |
| 7,107,431 | B2 | 9/2006 | Chiang et al. |
| 7,117,337 | B2 | 10/2006 | Chiang et al. |
| 7,793,070 | B2 * | 9/2010 | Stecher ............... G06F 12/1027 711/170 |
| 2005/0108496 | A1 | 5/2005 | Elnozahy et al. |
| 2005/0188175 | A1 | 8/2005 | Chiang et al. |
| 2009/0013149 | A1 | 1/2009 | Uhlig et al. |

OTHER PUBLICATIONS

"Digital Semiconductor 21172 Core Logic Chipset"—Technical Reference Manual, Chapter 6, Preliminary Edition—Subject to Change—May 23, 1996.
"Software Optimization Guide for AMD Family 10h Processors," Advanced Micro Devices, Chapter 12, Sep. 2007.
Advisory Action from U.S. Appl. No. 11/967,868, May 14, 2012, 3 pages.
Advisory Action from U.S. Appl. No. 11/967,868, Sep. 8, 2011, 3 pages.
Advisory Action from U.S. Appl. No. 13/722,485, Apr. 8, 2014, 3 pages.
Brunner R. A., "AMD Presentation for Linux Kernel Summit", AMD Fellow, Jul. 2005, 30 pages.
Final Office Action from U.S. Appl. No. 11/967,868, Jun. 22, 2011, 13 pages.
Final Office Action from U.S. Appl. No. 11/967,868, Mar. 6, 2012, 14 pages.
Final Office Action from U.S. Appl. No. 13/722,485, Dec. 9, 2015, 20 pages.
Final Office Action from U.S. Appl. No. 13/722,485, Jan. 16, 2015, 18 pages.
Final Office Action from U.S. Appl. No. 13/722,485, Jan. 30, 2014, 15 pages.
Final Office Action from U.S. Appl. No. 13/722,485, Sep. 16, 2016, 21 pages.
Final Office Action from U.S. Appl. No. 15/384,054, Feb. 9, 2018, 27 pages.

Final Office Action from U.S. Appl. No. 15/384,054, Mar. 15, 2019, 9 pages.
Final Office Action from U.S. Appl. No. 15/384,067, Feb. 9, 2018, 25 pages.
Final Office Action from U.S. Appl. No. 15/384,067, Mar. 15, 2019, 9 pages.
Final Office Action, U.S. Appl. No. 16/560,213, May 24, 2021, 9 pages.
Heinrich, Joe, "MIPS R4000 Microprocessor User's Manual," Second Edition, MIPS Technologies, Inc., 2011 North Shoreline, Mountain View, California 94039-7311, 1994, 754 pages.
Juan E. Navarro et al., Practical, Transparent Operating System Support for Superpages, Proc. 5th Symp. on OS Design and Implementation, Boston, MA, Dec. 9-11, 2002, 17 pages.
Juan E. Navarro, Transparent Operating System Support for Superpages, Ph.D. Thesis, Rice University, Houston, TX, Mar. 2004, 114 pages.
Lee et al., A Banked-Promotion TLB for High Performance and Low Power, 2001, Samsung, 6 pages.
Navarro, Juan E., Transparent operating system support for superpages, 2004, Rice University, 8 pages.
Non-final Office Action from U.S. Appl. No. 11/967,868, Nov. 3, 2010, 13 pages.
Non-final Office Action from U.S. Appl. No. 11/967,868, Oct. 5, 2011, 15pages.
Non-final Office Action from U.S. Appl. No. 13/722,485, Apr. 6, 2016, 18 pages.
Non-final Office Action from U.S. Appl. No. 13/722,485, Aug. 16, 2013, 11 pages.
Non-Final Office Action from U.S. Appl. No. 13/722,485, Jul. 7, 2015, 19 pages.
Non-Final Office Action from U.S. Appl. No. 13/722,485, Jun. 23, 2014, 13 pages.
Non-Final Office Action from U.S. Appl. No. 13/722,485, Mar. 23, 2017, 8 pages.
Non-Final Office Action from U.S. Appl. No. 15/384,054, Sep. 21, 2018, 21 pages.
Non-Final Office Action from U.S. Appl. No. 15/384,067, Jun. 16, 2017, 17 pages.
Non-Final Office Action from U.S. Appl. No. 15/384,067, Sep. 21, 2018, 18 pages.
Non-Final Office Action in co-pending related U.S. Appl. No. 15/384,054, Jun. 16, 2017, 19 pages.
Non-Final Office Action, U.S. Appl. No. 16/560,213, Oct. 5, 2020, 7 pages.
Notice of Allowance from U.S. Appl. No. 11/967,868, Sep. 25, 2015, 5 pages.
Notice of Allowance from U.S. Appl. No. 13/722,485, Dec. 6, 2017, 12 pages.
Notice of Allowance from U.S. Appl. No. 13/722,485, Dec. 28, 2017, 9 pages.
Notice of Allowance from U.S. Appl. No. 15/384,054, Jun. 12, 2019, 10 pages.
Notice of Allowance from U.S. Appl. No. 15/384,067, Aug. 7, 2019, 4 pages.
Notice of Allowance from U.S. Appl. No. 15/384,067, Jun. 12, 2019, 9 pages.
Patterson et al., Computer Organization and Design, 2005, 3rd ed., 4 pages.
Patterson et al., Computer Organization and Design, 2009, Elsevier, 4 pages.
Talluri et al., A New Page Table for 64-bit Address Spaces, 1995, ACM, 17 pages.
Talluri et al., Tradeoffs in Supporting Two Page Sizes, 1992, ACM, 10 pages.
Talluri, Madhusudhan, "Use of Superpages and Subblocking in the Address Translation Hierarchy," Dissertation at the University of Wisconsin-Madison, 1995, 193 pages.
Uhlig et al., Performance of Address-Space Multiplexing on the Pentium, 2002, CiteSeer, 15 pages (Year: 2002).

\* cited by examiner

100

102

PROCESSOR 110
4 KBYTE TLB 112
64 KBYTE TLB 114
4 MBYTE TLB

SYSTEM MEMORY

104

108
PAGING STRUCTURE

106
NONVOLATILE MEMORY

502
INITIALIZE ALIGN PAGE TABLE
ENTRIES

504
SET RESERVED BIT

506
PERFORM OPERATIONS

508
DEALLOCATE PAGE

METHOD, SYSTEM, AND APPARATUS FOR PAGE SIZING EXTENSION

BACKGROUND OF THE INVENTION

Many processors may make use of virtual or demand-paged memory schemes, where sections of a program's execution environment may be mapped into fixed sized segments or frames of physical memory as needed. Virtual memory schemes may allow the use of a physical memory that may be much smaller in size than the linear address space of the processor and may also provide a mechanism for memory protection so that multiple tasks or programs sharing the same physical memory do not interfere with each other. The effectiveness of caching techniques employed to facilitate translation of a linear or virtual address to physical address may be limited by the page or frame sizes used in some computing systems.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
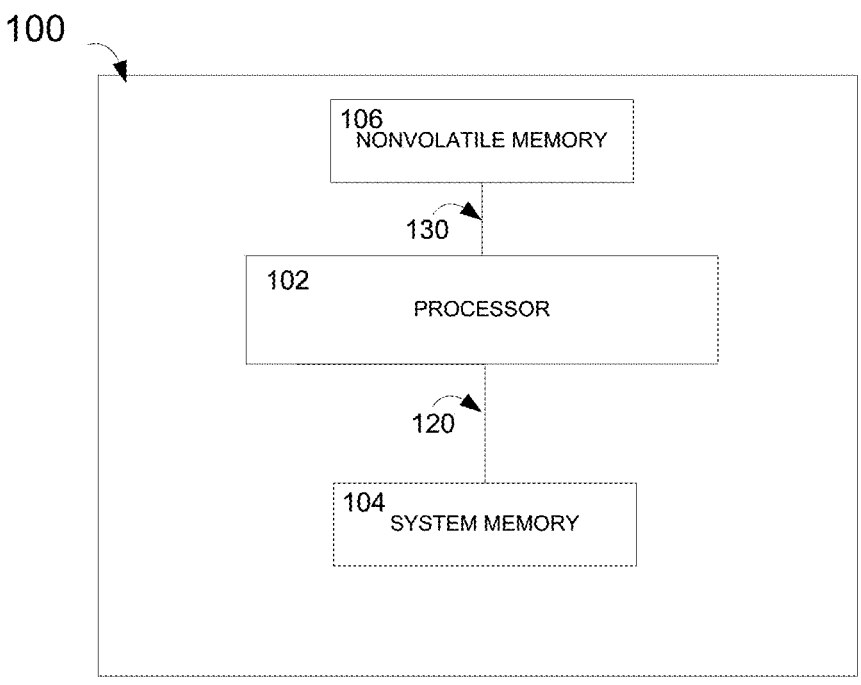
FIG. 1 is a schematic illustration of a computing system according to an embodiment of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the invention provide a method for generating or enabling the use of a larger page in the physical or system memory of a computing system by aligning a fixed number of pages having a page size smaller than that of the page being enabled. A fixed plurality of page table entries for a fixed plurality of pages in a memory, each page having a first page size, may be initialized. A linear address for each page in each page table entry may correspond to a physical address. The fixed plurality of pages may be aligned. A bit or flag in each of the page table entries of the fixed plurality of pages may be set to indicate whether or not the fixed plurality of pages is to be treated as one combined page having a second page size larger than the first page size. In some embodiments, the second page size may be 64 Kbytes and generating from 16 aligned 4 Kbyte pages. Other sizes may be used.

Reference is now made to FIG. 1, a schematic illustration of a computing system 100 capable of enabling a larger page size from a fixed number of aligned smaller pages according to embodiments of the invention. Computing system 100 may be or include, for example, a personal computer, a desktop computer, a mobile computer, a laptop computer, a notebook computer, a terminal, a workstation, a server computer, a network device, or other suitable computing device. Although the invention is not limited in this respect, computing system 100 may include a processor 102 that may access one or memories via a paging system and may operate in accordance with embodiments of the invention. In addition, computing system 100 may include a system memory 104 and a nonvolatile memory 106 which may be coupled to processor 102 via bus 120 and bus 130 respectively. Other components or logical elements may also be included in computing system 100 such as for example a peripheral bus or an input/output device. Alternative configurations or topologies may also be included such as for example a common bus for coupling processor 102, system memory 104, nonvolatile memory 106, and possibly other components or chip sets.

As used herein, processor 102 may be or include a single integrated circuit that includes one or more execution cores. Each execution core may include logic for executing instructions and dedicated resources as needed for each core to execute instructions individually. Additional or multiple processors may be used.

System memory 104 may be or include, for example, any type of memory, such as static or dynamic random access memory. System memory 104 may be used to store instructions to be executed by and data to be operated on by processor 102, or any such information in any form, such as for example operating system software, application software, or user data.

System memory 104 or a portion of system memory 104 (also referred to herein as physical memory) may be divided into a plurality of frames or other sections, wherein each frame may include a predetermined number of memory locations, e.g. a fixed size block of addresses. The setup or allocation of system memory 104 into these frames may be accomplished by for example an operating system or other unit or software capable of memory management. The memory locations of each frame may have physical addresses that correspond to linear addresses that may be generated by for example processor 102. In order to access the correct physical address, the linear address may be translated to a corresponding physical address. This translation process may be referred to herein as paging or a paging system. In some embodiments of the present invention, the number of linear addresses may be different, e.g. larger than those available in physical memory. The address conversion information of a linear address may be stored in a page table entry. In addition, a page table entry may also include information concerning whether the memory page has been written to, when the page was last accessed, what kind of processes (e.g., user mode, supervisor mode) may read and write the memory page, and whether the memory page should be cached. Other information may also be included.

In one embodiment, pages in memory are of three sizes such as for example 4 Kbytes, 64 Kbytes and 4 Mbytes, and different parts of memory may be assigned to each of these page sizes. Other numbers of pages sizes and allocations of memory are possible. Enabling a 64 Kbyte page size may provide additional granularity for an operating system and/ or memory management software in utilizing a limited amount of physical memory.

Nonvolatile memory 106 may be or include, for example, any type of nonvolatile or persistent memory, such as a disk drive, semiconductor-based programmable read only memory or flash memory. Nonvolatile memory 106 may be used to store any instructions or information that is to be retained while computing system 100 is not powered on. In alternative embodiments, any memory beyond system memory (e.g. not necessarily non-volatile) may be used for storage of data and instructions.

Figure 2:
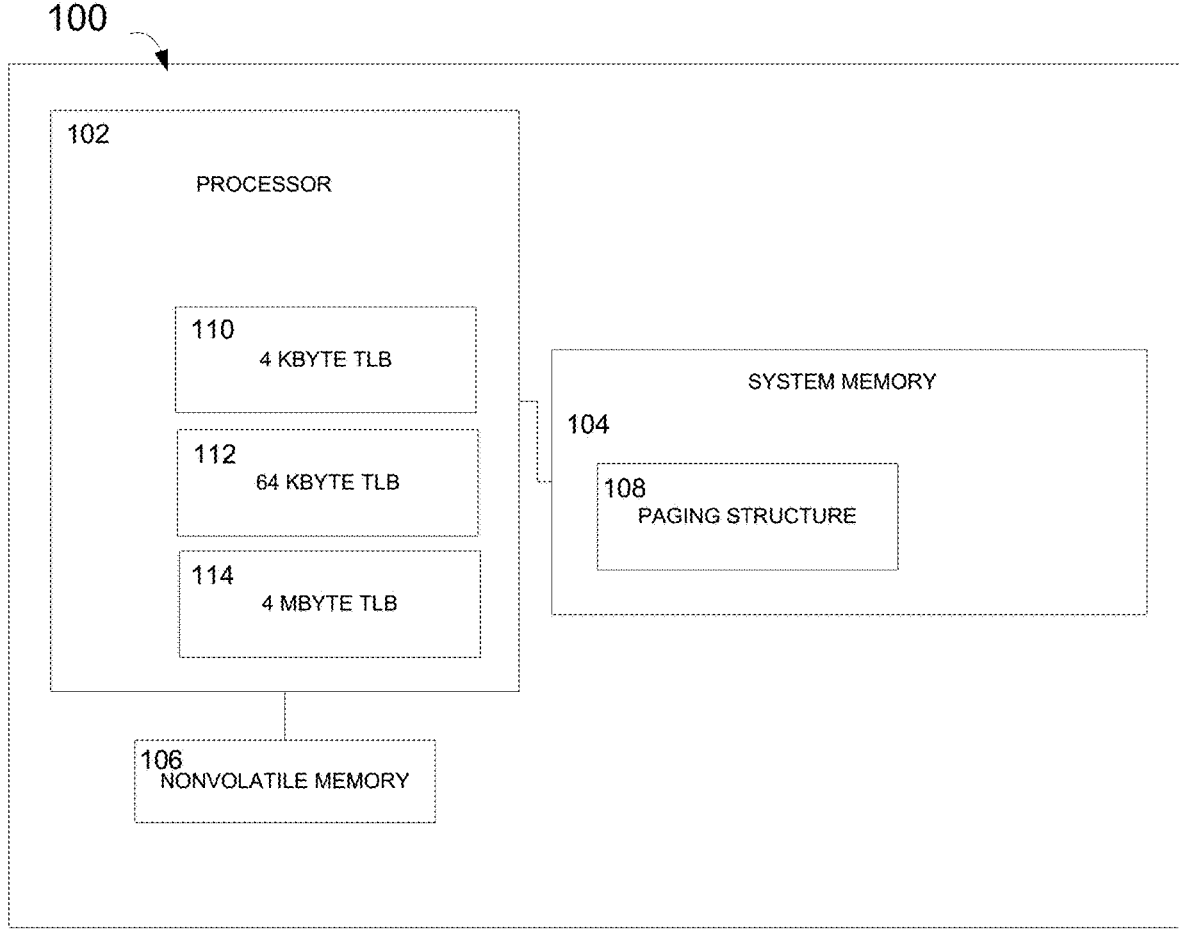
FIG. 2 is a schematic illustration of a computing system according to an embodiment of the invention.

Reference is now made to FIG. 2, a schematic illustration of a computing system 100 according to an embodiment of the invention. As part of a translation caching scheme, processor 102 may include a translation lookaside buffer (TLB) for each page size in system memory 104. Incorporating TLBs into processor 102 may enhance access speed, although in some alternative embodiments these TLBs may be external to processor 102. TLBs may be used in address translation for accessing a paging structure 108 stored in system memory 104 such as for example a page table. Alternatively, paging structure 108 may exist elsewhere such as in a data cache hierarchy. The embodiment of FIG. 2 shows three TLB's, 4 Kbyte TLB 110, 64 Kbyte TLB 112, and 4 Mbyte TLB 114, although other TLB's corresponding to the various page sizes present in system memory 104 may also be used.

As used herein, a TLB may be or include a cache or other storage structure which holds translation table entries recently used by processor 102 that map virtual memory pages (e.g. having linear or non-physical addresses) to physical memory pages (e.g., frames). In the embodiment of FIG. 2, each TLB may be set-associative and may hold entries corresponding to the respective page size indicated. Alternatively, a single fully associative TLB for all three page sizes may also be implemented. Other numbers of page sizes with corresponding different TLB entries may be used. Further different TLBs may be used to cache different information such as for example instruction TLBs and data TLBs.

Although TLBs are used herein to denote such caches for address translation, the invention is not limited in this respect. Other caches and cache types may also be used. In some embodiments, the entries in each TLB may include the same information as a corresponding page table entry with an additional tag, e.g. information corresponding to the linear addressing bits needed for an address translation. Thus, each entry in a TLB may be an individual translation as referenced by for example the page number of a linear address. For example for a 4 Kbyte TLB entry, the tag may include bits 12 and higher of the linear address. The entry in a TLB may contain the page frame, e.g. the physical address in the page table entry used to translate the page number. Other information such as for example "dirty bit" status may also be included.

Processor 102 may cache a TLB entry at the time it translates a page number to a page frame. The information cached in the TLB entry may be determined at that time. If software such as for example a running application modifies the relevant paging-structure entries after this translation, the TLB entry may not reflect the contents of the paging-structure entries.

When a linear address requires translation such as for example when an operating program must access memory for an instruction fetch or data fetch, the memory management part of operating system software executing or circuitry operating on processor 102 or elsewhere in computing system 100 may search for the translation first in all or any of the TLBs. If the translation is stored in a TLB, a TLB hit may be generated, and the appropriate TLB may provide the translation. In the event that processor 102 can't find an entry in any of TLBs, a TLB miss may be generated. In this instance, a page table walker may be invoked to access the page tables and provide the translation. As used herein, a page table walker is any technique or unit for providing a translation when another address translation unit (such as a TLB) cannot provide the translation such as for example by accessing the paging structure hierarchy in memory. Techniques for implementing such a page table walker that can accommodate the page sizes as described herein for embodiments of the invention are known in the art.

Figure 3:
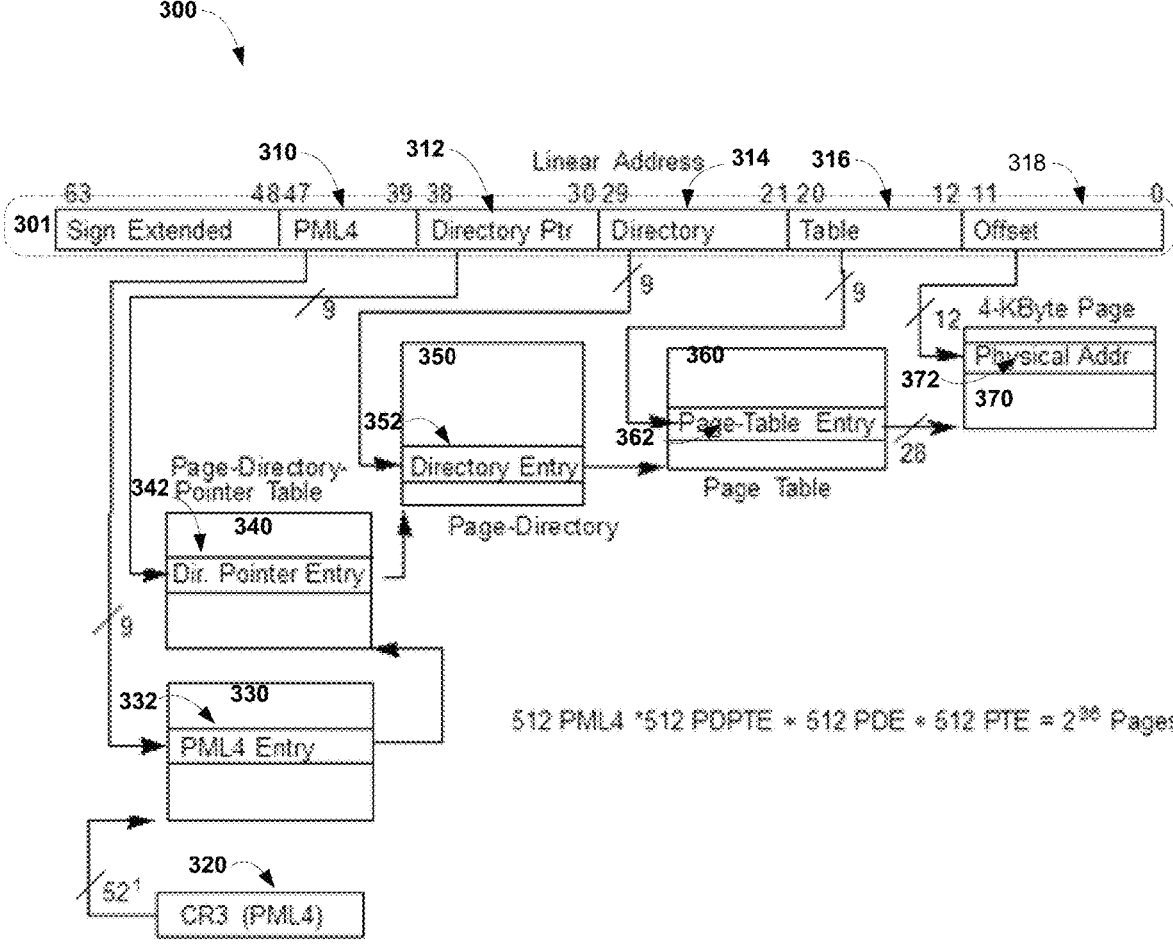
FIG. 3 is a schematic illustration of an address translation scheme to an embodiment of the invention.

In one embodiment, the number of effective page sizes available in a system may be increased while maintaining compatibility with an existing architecture such as for example the Intel IA-32 architecture manufactured by Intel Corporation, by allowing multiple pages having a certain page size to be combined into a larger page. Providing a third or additional page size such as 64 Kbytes, in between a small page size such as 4 Kbytes and a larger one such as 2 or 4 Mbytes may reduce the TLB miss rate encountered for the smaller page size allocation, e.g. 4 Kbytes, while providing a higher granularity than that of the larger 4 Mbyte page size allocations. While one embodiment discussed includes increasing the range of page sizes from two to three, other numbers of effective page sizes may be achieved. Reference is now made to FIG. 3, a schematic illustration of an address translation scheme or mapping 300 for accessing 4 or 64 Kbyte pages in a physical memory with a 64 bit linear address such as linear address 301 according to an embodiment of the invention. The address translation scheme of FIG. 3 for a linear address 301 may have a configuration in which four kinds of tables or paging structures—page map level (PML) 4 table 330, page directory pointer (PDP) table 340, page directory 350, and page table 360—are connected by pointers or links. The hierarchy of these tables may be structured with PML 4 table 330 at the highest level, followed by PDP table 340, page directory 350, and page table 360 at the lowest level. For the embodiments of FIG. 3, at least some portion of memory 104 may be divided into 4 or 64 Kbyte pages, although other fixed page sizes may be used and other numbers of page sizes may be used. Further, in the embodiment of FIG. 3, all paging structures may include 512 entries having a length of 8 bytes, e.g. each entry is 64 bits. Such 64 bit entries may be used by for example a computing system implementing an Intel IA-32e processor architecture.

In one embodiment linear address 301 may include five sets of bits: PML 4 table bits 310, PDP table bits 312, page directory bits 314, page table bits 316, and offset bits 318. Each of these sets of bits may provide an offset used in translating linear address 301 to a corresponding physical address. Other bit mapping hierarchies may also be used, and other sets of bits may be used.

A control register 320 or another memory space may store or contain the physical address of PML 4 table 320. An entry in PML 4 table 330 such as PML 4 entry 332 may be selected or determined by for example bits 47:39, e.g. PML 4 table bits 310 of linear address 301. PML 4 entry 332 may be used for all linear addresses in the 512-Gbyte region of linear addresses with the same value in bits 47:39. Here and elsewhere herein, other specific locations may be used.

The bits of PML 4 entry 332 may be used as an offset from the base address of PML 4 table 330 to access PDP table 340. Specifically, PML 4 entry 332 may contain the physical address of PDP table 340. A PDP table entry 342 may be selected or determined by for example bits 38:30 of linear address 301, e.g. PDP table bits 312. PDP table entry 342 may be used for all linear addresses in the 1-Gbyte region of linear addresses with the same value in bits 47:30.

The bits or information of PDP table entry 342 may be used to access page directory 350. For example, PDP table entry 342 may contain the physical address of page directory 350. A page directory entry (PDE) 352 may be selected or determined by for example bits 29:21 of linear address 301, e.g. page directory bits 314. PDE 352 may be used for all linear addresses in the 2-Mbyte region of linear addresses with the same value in bits 47:21.

The bits of PDE 352 may be used to access page table 360. For example, PDE 352 may contain the physical address of page table 360. A page table entry 362 may be selected or determined by for example bits 20:12 of linear address 301, e.g. page table bits 316. Page table entry 362 may be used for all linear addresses in the 4-Kbyte region of linear addresses with the same value in bits 47:12.

The bits of page table entry 362 may be used to access a page 370. For example, page table entry 362 may contain the physical address of page 370. A physical address 372 may be selected or determined by bits for example 11:0 of linear address 301, e.g. page table bits 318.

In addition to bits used for physical addressing, each entry in a paging structure may contain bits that control the translation process and how linear addresses may be used. For example, a bit 5 may be set to 1 in all paging-structure entries to indicate that a linear address is being used to access memory. A bit 6 may be set to 1 in a page table entry 362 when a linear address is dirty, e.g. has been used to write to the corresponding location in physical memory. In some embodiments, if the dirty bit of any page table entry of one of the 16 aligned 4 Kbyte pages is set, the operating system, execution management, or memory management software may assume that all 16 pages have been changed, e.g. are dirty.

To distinguish the newly created second page size from the page size from which it was constructed (such as for example a 64 Kbyte page from a 4 Kbyte page) in for example a page table entry 362, a flag or bit for a page size (e.g., 64 Kbyte) such as bit or flag 449 may also be included in page table entry format 440. Setting this flag such as for example by setting the bit equal to one may indicate the presence of a 64 Kbyte page in memory beginning at the page base address indicated by address field 441. Setting bit 51 may also indicate that a page table entry should be cached using a 64 Kbyte TLB such as for example TLB 112. If the bit is not set, the page table entry may be cached using a different size, such as a 4 Kbyte TLB such as TLB 110.

In some embodiments, a page table walk in a computing system using the new page size may proceed in the same manner as a page table walk for the smaller page size in a computing system not employing some embodiments of the present invention with the additional operation of determining page size of the page table entry, the new, e.g. larger page size or the smaller page size. For example, when bit 51 is set and a TLB miss occurs, a four level page table walk may be performed as known in the art and implemented for example in an Intel 64 (IA-32e) architecture. This four level page table walk may proceed or include the same steps as may be performed for all four levels of the paging hierarchy for a 4 Kbyte TLB miss in a computing system without a 64 Kbyte page size. However, in some embodiments, at the fourth level, an additional operation in the page table walk to determine the state of bit 51 may be performed. This additional operation may allow processor 102 to determine if the page being accessed is for example either a 4 Kbyte or a 64 Kbyte page size. For example, if bit 51 is set, the page size may be 64 Kbytes. Other or additional operations may also be included in the page table walk. Further, alternative page table walks or search techniques may also be used.

Figure 4:
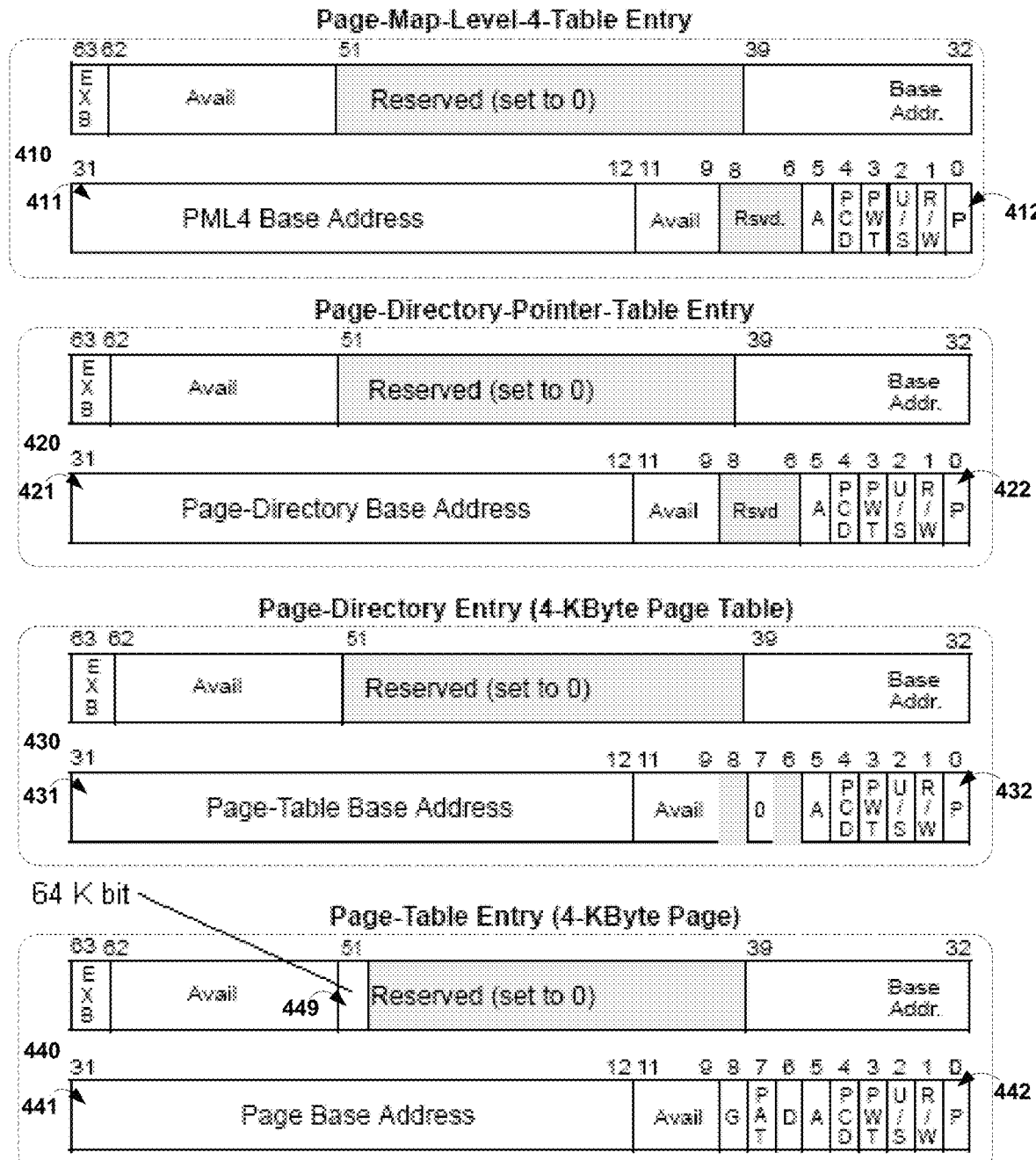
FIG. 4 shows the format of paging structure entries according to an embodiment of the invention.

Reference is now made to FIG. 4 which shows the format of paging structure entries according to an embodiment of the invention including PML4 table entry format 410, PDP table entry format 420, PDE format 430, and page table entry format 440. These entry formats may be used for example in the corresponding entries of FIG. 3, e.g. PML4 entry 332, PDP table entry 342, PDE 352, and page table entry 362. Other or different formats may be used.

In each entry of FIG. 4 there is an address field (411, 421, 431, and 441) of bits 32 to 12 that may point to a head, e.g. base address of a lower-level table or page. Each entry may further include a P bit or flag (412, 422, 432, and 442) that may be maintained by the operating system of computer system 100 or other executive software. In some embodiments, the P flag may indicate whether the page or page table being pointed to by the entry is currently loaded in physical memory. For example, if the flag is set, the page may be in physical memory and address translation may be carried out. However, if the flag is clear, e.g. not set, the page may not be in memory. In some embodiments setting a bit or flag may include setting the bit or flag's value equal to one, while clearing a bit or flag may be setting the bit or flag's value equal to zero, although other terminology and values may be used (for example, since the choice of 1 and 0 in some cases is arbitrary, this may be reversed). If the processor attempts to access the page, a page fault exception may be generated. Upon occurrence of a page fault exception, the operating system or execution management software may copy the page from nonvolatile (e.g., disk) memory 106 into system (physical) memory 104, load the page address into the page table or page directory entry, set the P flag, and invalidate the current page table entry in the corresponding TLB along with all other entries in one or all of the TLBs. In some embodiments, the invalidation operation may invalidate TLB entries for other pages in addition to the one that triggered the page fault exception. Additionally, processor

102 may also invalidate a single TLB entry in a single TLB when the operating system changes a page table entry.

Figure 5:
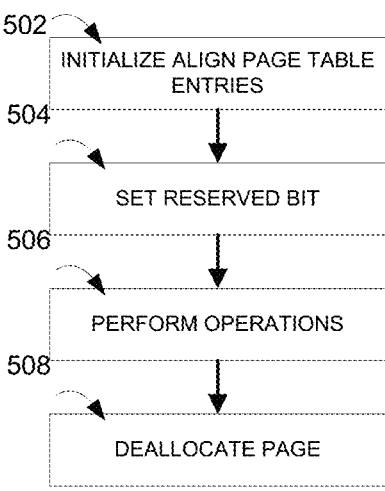
FIG. 5 depicts a method for enabling a larger page size from a fixed number of smaller pages according to an embodiment of the invention.

Reference is now made to FIG. 5, a flowchart of a method for enabling the use of a larger page size from a fixed number of aligned smaller pages according to an embodiment of the invention. Embodiments of the method may be used by, or may be implemented by, for example, computing system 100 of FIG. 1 or other suitable computing systems that incorporate multiple page sizes. In some embodiments, the method of FIG. 5 may be implemented by for example an operating system or other execution management software stored in memory 104 and running on processor 102. Additional or alternative software and/or hardware components of computing system 100 may be used.

As indicated in operation 502, an operating system or other execution management software of for example computing system 100 may initialize a larger fixed page size by for example aligning or identity mapping the appropriate address bits corresponding to the page size being initialized across a number of consecutive page table entries for a smaller fixed page size such that the total memory so aligned is the same as the larger page size. As used herein, identity mapped address bits of a linear address may be identical to the corresponding bits in a physical address. In this way, a fixed number of smaller pages may be combined into one larger page of a fixed size, the fixed size of the larger page possibly being smaller than an even larger page size supported by the system, thereby adding an intermediate fixed page size. For example, 16 4 Kbyte page table entries may be aligned to form a 64 Kbyte page size. To perform the initialization, address bits 12-15 may be identity mapped across a group of 16 4 Kbyte pages such that in the first, second, third and sixteenth page these bits may have an entry of 0000, 0001, 0010, and 1111 respectively. For all other bits of the page table entry, the operating system may write an identical entry for all sixteen 4 Kbyte page table entries corresponding to the 64 Kbyte page. When these page table entries are combined or aligned, the linear address of each page table entry may translate or correspond directly to an address in physical memory such as for example system memory 104. In some embodiments initializing a 64 Kbyte page size may occur when computing system 100 starts up or upon a request for an additional memory allocation as need for example by an executing or starting application. Other events may also require initialization of a 64 Kbyte page size.

In operation 504, the operating system may set a previously reserved bit or other flag of a format such as format 340 of FIG. 3 in each of the 16 aligned page table entries to indicate that computing system 100 or processor 102 of computing system 100 should cache the respective page table entry using a TLB sized for the larger page size. For example, a 64 Kbyte TLB such as TLB 112 of FIG. 2 may be used to cache 64 Kbyte page table entries such as page table entry 262. Setting may include, for example, setting the value of a bit to one. Other flags or indicators than a single bit may be used. Bits other than reserve bits may be used.

Once the page table entries have been aligned and the reserved bits set, processor 102 may commence or continue execution (Operation 506).

In operation 508, the larger page may be deallocated, e.g. made available for another use such that the smaller pages that are included in the larger page are available for other operations in their originally configured page size. For example, a 64 Kbyte page may be deallocated to its originally configured 16 4 Kbyte pages. At this point, the reserved bit in each page table entry may no longer be set.

In some embodiments, deallocation may include combining dirty and/or accessed bits, e.g. page table entry bits that may indicate the memory access or usage of the respective pages, across the 16 pages. Combining may include for example a logical OR operation such that if any one of the entries for the 16 pages has a bit that is set, all 16 entries are treated as set. For example, if the dirty bit for the third entry is set, all 16 entries are treated as dirty. The result of combining may be that if any of the pages are dirty or accessed, all 16 may written out to a nonvolatile memory.

Although the invention has been described herein with respect to 64 Kbyte pages as 16 aligned 4 Kbyte pages, the invention is not limited in this respect. Other page sizes may be provided by aligning other smaller page sizes that may exist in a processor architecture. Embodiments of the invention may be used for creating a page size that is a power of two times larger than a first page size used to create a larger page size, for page sizes up to the next largest pre-existing page size. For example, a 1024 Kbyte page size may be provided as 16 aligned 64 Kbyte pages with a corresponding designated bit being set in the appropriate paging structure entries. Further, for a computing system having a 4 Kbyte page size and a 2 Mbyte page size in a 64 bit architecture, any page size that is a power of 2 greater than (e.g. a power of two multiplied by) 4 Kbyte and less than 2 Mbytes may be so created. Other multiples may also be used.

Other operations or series of operations may be used.

While the invention has been described with respect to a limited number of embodiments, it will be appreciated that many variations, modifications and other applications of the invention may be made. Embodiments of the present invention may include other apparatuses for performing the operations herein.

Embodiments of the invention may include a computer readable medium, such as for example a memory, a disk drive, or a Universal Serial Bus (USB) flash memory, including instructions which when executed by a multi-core processor, another processor, or another controller, may carry out methods disclosed herein. Such apparatuses may integrate the elements discussed, or may comprise alternative components to carry out the same operations.

It will be appreciated by persons skilled in the art that the appended claims are intended to cover all such modifications and changes as fall within the true spirit of the invention.

What is claimed is:

1. A processor comprising:

a register to store a base address of a first translation table of a plurality of translation tables, the plurality of translation tables to map virtual memory to physical memory;

a translation table walker to look up a first entry in the first translation table, a second entry in a second translation table, a third entry in a third translation table, and a fourth entry in a fourth translation table, wherein the first entry is to include a first physical address of the second translation table, the second entry is to include a second physical address of the third translation table, the third entry is to include a third physical address of the fourth translation table, and the fourth entry is to include a fourth physical address of a page, and the fourth entry is also to include controls, the controls including a bit being set to indicate that the page is a pre-selected size and may be built from pages that are of a size different from the pre-selected size, the bit indicating the presence of the page of the pre-selected size in memory beginning at a page base address indicated by an address field, the bit indicating that a page table entry should be cached using a translation lookaside buffer (TLB) associated with the pre-selected size, the bit being reset indicating the page table entry may be cached using a TLB associated with a different size, wherein performing a page table walk includes determining a page size of the page table entry based on the bit.

2. The processor of claim 1, wherein the first entry in the first translation table is to be selected using bits 47:39; of an input address.

3. The processor of claim 1, wherein the second entry in the second translation table is to be selected using bits 38:30 of an input address.

4. The processor of claim 1, wherein the third entry in the third translation table is to be selected using bits 29:21 of an input address.

5. The processor of claim 1, wherein the fourth entry in the fourth translation table is to be selected using bits 20:12 of an input address.

6. The processor of claim 1, wherein a fifth physical address in the page is to be selected using bits 11:0 of an input address.

7. The processor of claim 1, wherein the first entry, the second entry, the third entry, and the fourth entry each have a length of 64 bits.

8. The processor of claim 1, wherein the controls are also to include information about whether the page is dirty.

9. The processor of claim 1, wherein the controls are also to include information about whether the page has been accessed.

10. The processor of claim 1, wherein the controls are also to include information about access permissions.

11. The processor of claim 1, wherein the controls are also to include information about cacheability.

12. A method comprising:

looking up, by a translation table walker, a first entry in a first translation table of a plurality of translation tables, the plurality of translation tables to map virtual memory to physical memory, wherein a base address of the first translation table is stored in a register and the first entry includes a first physical address of a second translation table;

looking up, by the translation table walker, a second entry in the second translation table of the plurality of translation tables, wherein the second entry includes a second physical address of a third translation table;

looking up, by the translation table walker, a third entry in the third translation table of the plurality of translation tables, wherein the third entry includes a third physical address of a fourth translation table;

looking up, by the translation table walker, a fourth entry in the fourth translation table of the plurality of translation tables, wherein the fourth entry includes a fourth physical address of a page and the fourth entry also includes controls including a bit to be set to indicate that the is a pre-selected size and may be built from pages that are of a size different from the pre-selected size, the bit indicating the presence of the page of the pre-selected size in memory beginning at a page base address indicated by an address field, the bit indicating that a page table entry should be cached using a translation lookaside buffer (TLB) associated with the pre-selected size, the bit being reset indicating the page table entry may be using a TLB associated with a different size, wherein performing a page table walk includes determining a page size of the page table entry based on the bit.

13. The processor of claim 12, wherein looking up the first entry in the first translation table includes using bits 47:39 of an input address.

14. The processor of claim 13, wherein looking up the second entry in the second translation table includes using bits 38:30 of the input address.

15. The processor of claim 14, wherein looking up the third entry in the third translation table includes using bits 29:21 of the input address.

16. The processor of claim 15, wherein looking up the fourth entry in the fourth translation table includes using bits 20:12 of the input address.

17. The processor of claim 16, further including looking up a fifth physical address in the page using bits 11:0 of the input address.

18. A system comprising:

a physical memory; and a processor comprising:

a register to store a base address of a first translation table of a plurality of translation tables, the plurality of translation tables to map virtual memory to the physical memory;

a translation table walker to look up a first entry in the first translation table, a second entry in a second translation table, a third entry in a third translation table, and a fourth entry in a fourth translation table, wherein the first entry is to include a first physical address of the second translation table, the second entry is to include a second physical address of the third translation table, the third entry is to include a third physical address of the fourth translation table, and the fourth entry is to include a fourth physical address of a page, and the fourth entry is also to include controls, the controls to include a bit to be set to indicate that the page is a pre-selected size and may be built from pages that are of a size different from the pre-selected size, the bit indicating the presence of the page of the pre-selected size in memory beginning at a page base address indicated by an address field, the bit indicating that a page table entry should be using a translation lookaside buffer (TLB) associated with the pre-selected size, the bit being reset indicating the page table entry may be using a TLB associated with a different size, wherein performing a page table walk includes determining a page size of the page table entry based on the bit.

19. The system of claim 18, wherein the processor is a multicore processor.

20. The system of claim 18, further comprising a Universal Serial Bus flash memory.

* * * * *